A. J. HALL.
CONTROL SYSTEM.
APPLICATION FILED JULY 19, 1917.
1,317,287.
Patented Sept. 30, 1919.
2 SHEETS—SHEET 1.
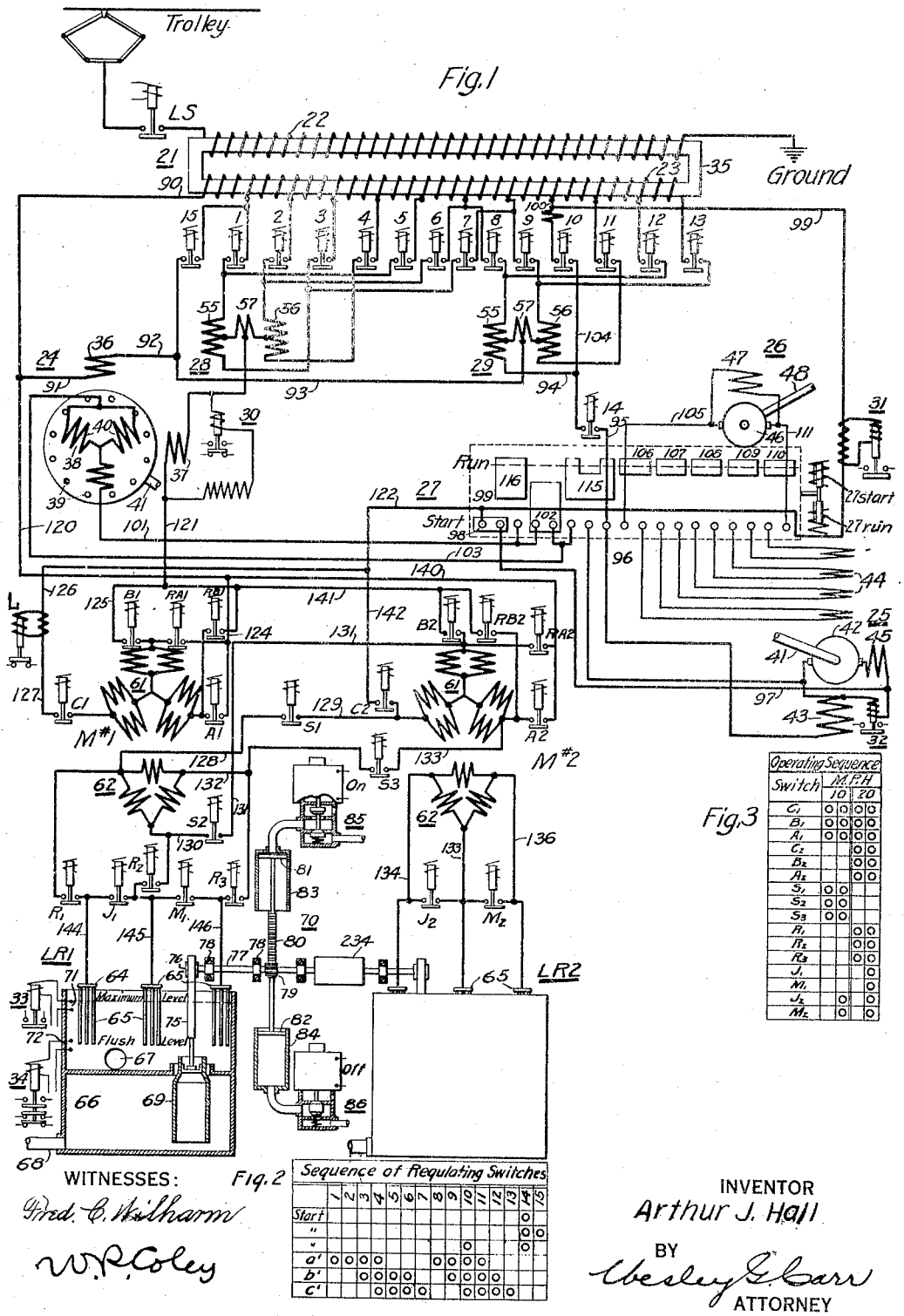
INVENTOR
Arthur J. Hall
BY
Wesley G. Carr
ATTORNEY

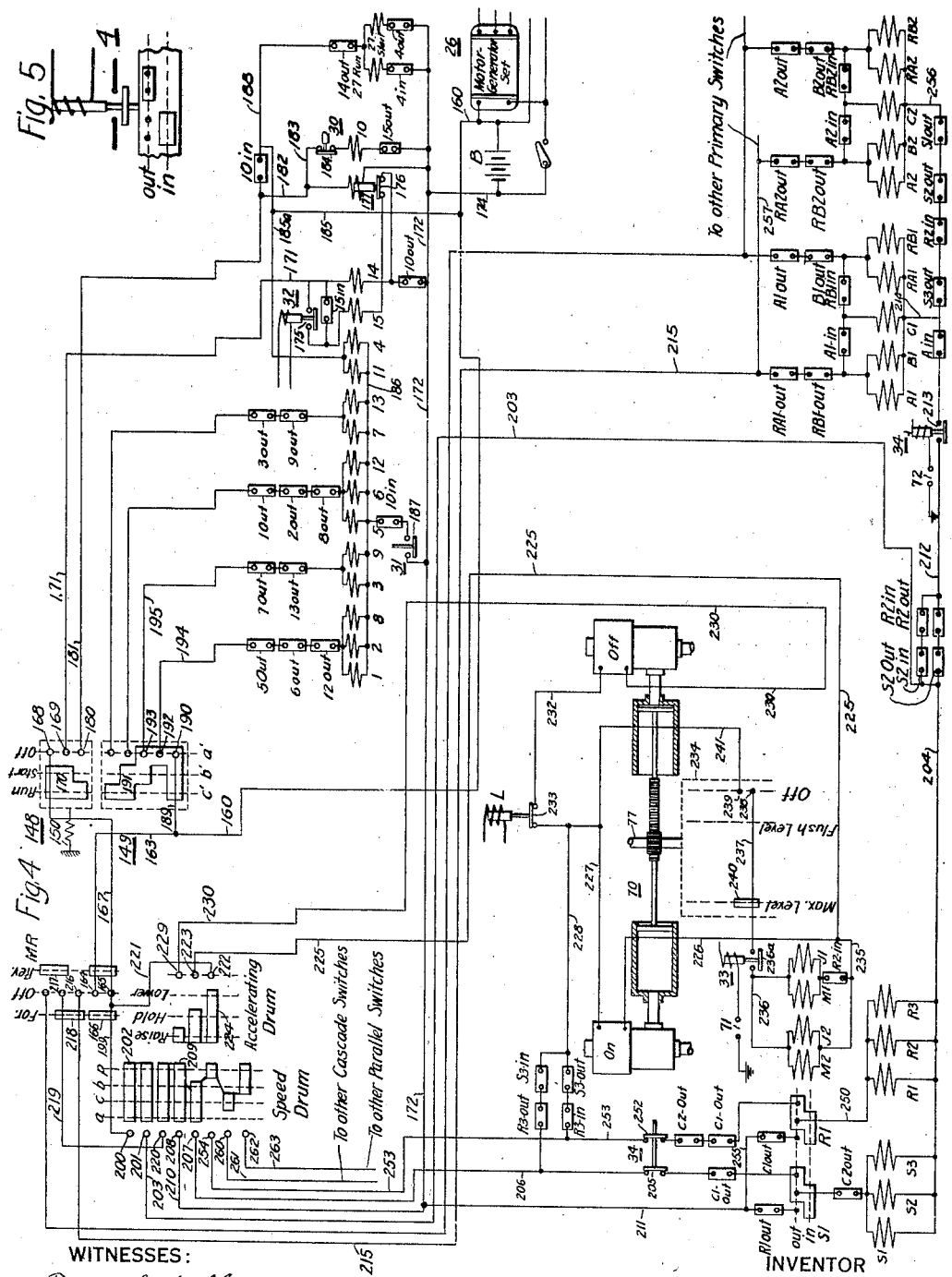

UNITED STATES PATENT OFFICE.

ARTHUR J. HALL, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,317,287.   Specification of Letters Patent.   Patented Sept. 30, 1919.

Application filed July 19, 1917. Serial No. 181,536.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Systems, of which the following is a specification.

My invention relates to control systems and especially to the control of a plurality of induction motors that are operated in conjunction with a phase-converting machine.

The object of my invention is to provide an effective and reliable auxiliary control system for automatically governing certain control operations in a desired sequence, whereby undesirable current surges and the like are obviated.

More specifically stated, it is the object of my invention to provide certain novel electrical interlocking circuits between the various pieces of apparatus that are employed in a system of the above-indicated character, whereby safety and smoothness of operation are secured to a high degree.

My invention may best be understood by reference to the accompanying drawings, wherein Figure 1 is a diagrammatic view of the main circuits of a system of control embodying the invention; Fig. 2 and Fig. 3 are sequence charts, of a well-known form, for indicating the order of operation of the various switches that are shown in Fig. 1; Fig. 4 is a diagrammatic view of one set of auxiliary governing circuits for the main system that is shown in Fig. 1; and Fig. 5 is a detailed diagrammatic view of one of the main-circuit switches.

Referring to Fig. 1, the system shown comprises suitable supply-circuit conductors Trolley and Ground; a plurality of main dynamo-electric machines or driving induction motors, two of which, M#1 and M#2, are illustrated; a plurality of secondary-circuit regulating resistors, such as liquid rheostats LR1 and LR2 for the induction motors; a main transformer 21 having a primary winding 22 and a secondary or distributing winding 23 that operates in conjunction with a phase-converting machine 24 for supplying three-phase energy to the propelling motors; a combined alternating-current starting motor and direct-current exciter 25 for the phase-converting machine 24; a motor-generator set 26 or other source of direct-current energy; a change-over switch 27 having two operative positions respectively marked "Start" and "Run" for governing the operation of the phase-converting machine and its allied auxiliary machines; a plurality of sets of preventive coils 28 and 29, or equivalent devices, for preventing current surges and short-circuits of transformer-winding section during transition from one transformer tap to another; a plurality of relay devices 30, 31, 32, L, 33 and 34 that are connected in circuit with various portions of the main control system for governing certain auxiliary control-circuit connections, as hereinafter traced in detail; a line switch LS for connecting the primary transformer winding 22 across the supply circuit; a plurality of secondary transformer-winding switches 1 to 15, inclusive; a plurality of primary induction-motor switches A1, B1 and C1 and coöperating reversing switches RA1 and RB1; a plurality of similarly functioning switches A2, B2, C2, RA2 and RB2 for the primary winding of the motor M#2; a plurality of cascade switches S1, S2 and S3 and of parallel switches R1, R2 and R3 that are employed for connecting the induction motors M#1 and M#2 to provide different ranges of operating speed; and a plurality of switches J1 and M1, and J2 and M2, for short-circuiting the secondary windings of the induction motors M#1 and M#2, respectively, under full-speed operating conditions.

The phase converter 24 comprises a primary or exciting winding 36 that is energized in phase with the secondary transformer winding 23; a secondary or induced winding 37 having approximately 86.6 per cent. of the number of turns in the primary winding 36; and a rotor 38 which is provided with a squirrel-cage winding 39 to produce the well-known induction-motor action when starting the phase converter and which is also provided with a direct-current exciting winding 40 for purposes of power-factor regulation. The exciting winding 40 is connected in star relation, two of the winding legs having a common terminal, whereby a two-wire direct-current circuit may be completed from the motor-generator set 26, as hereinafter traced in detail.

The phase converter 24 is mechanically associated, by means of a shaft 41, for example, with a commutator-type armature 42 of the starting motor 25, which further comprises an alternating-current exciting field winding 43, a plural-section direct-current exciting winding 44 and a compensating or commutating field winding 45.

For the sake of simplicity and clearness, only the generator portion of the motor-generator set 26 is illustrated in Fig. 1. The preferred type of unit comprises a direct-current generating armature 46 that is provided with any suitable type of excitation, such as that supplied by a shunt field winding 47. The armature 46 is mounted upon a shaft 48 which also carries a three-phase driving motor, as indicated in Fig. 4.

The change-over switch 27 is preferably of the drum type and is provided with a plurality of actuating coils "27-Start" and "27-Run" for moving the switch into the corresponding position. The actuating coils are energized in accordance with auxiliary circuits that will be traced in connection with Fig. 4.

The change-over switch 27, in its position "Start", is adapted to effect the connection of the starting motor 25 as an alternating-current series motor to the secondary transformer winding and at the same time break up the direct-current exciting winding 44 into sufficiently small sections to prevent a relatively high voltage being induced therein, in accordance with principles of operation that are familiar in the case of starting rotary converters. In the "run" position of the change-over switch, the starting motor 25 is converted into a direct-current generator for exciting the rotary winding 40 of the phase-converter 24.

Each set of preventive coils 28 and 29 comprises suitable inductive units or windings 55 and 56, the terminals of each of which are connected to certain of the transformer switches and a third unit or winding 57 which is connected between the mid-points of the windings 55 and 56 and has its mid-point, in the one case, connected to the secondary phase-converter winding 37 and, in the other case, to the primary converter winding 36. Since the construction and function of the preventive coils is familiar to those skilled in the art, no further description thereof is deemed necessary here.

The converter-secondary-winding relay 30 is connected through a suitable voltage-reducing resistor across the secondary winding 37 of the phase-converting machine for the purpose of lifting to close certain auxiliary circuits, as subsequently traced in Fig. 4, only after the phase converter has attained substantially full speed voltage conditions.

During operating periods, whenever the phase-converter voltage supply is interrupted, the relay 30 acts similarly to a time-element device, since a period of 5 or 6 seconds elapses before the voltage of the secondary winding 37 decreases to such a value that the relay device is allowed to drop. Thus, ordinary bouncing of the trolley or pantograph or the passage thereof under a section break will not cause an interruption of the auxiliary circuits that are governed by the relay 30.

The line-voltage relay 31 is adapted to complete certain auxiliary-circuit connections whenever normal voltage conditions obtain in the supply-circuit transformer 21, the relay opening upon an interruption of supply-circuit voltage.

The starting-motor relay 32 is energized by the voltage of the starting-motor 25, and when in its upper position, the relay closes certain auxiliary circuits to be set forth.

Each of the driving induction motors M#1, M#2, etc., comprises a star-connected primary or stator winding 61 and a delta-connected secondary or rotor winding 62. The switches A1, B1 and C1 serve to connect the respective terminals of the primary winding of the motor M#1 to the three-phase circuits that are supplied in a well-known manner with a three-phase voltage from the supply-circuit transformer and the phase-converter jointly. The switches RA1 and RB1 are connected to reverse or interchange the phases corresponding to the switches A1 and B1, thereby permitting reversed operation of the driving induction motors whenever desired. A similar set of switches is utilized for governing the motor M#2.

The liquid rheostats LR1, LR2, etc., each comprise essentially a container or tank 64 within which are positioned a set of electrodes or plates 65 for connection to the respective terminals of the secondary induction-motor winding 62. A reservoir or bottom compartment 66 is provided, and normally, that is, when the induction motors are not operating, an inlet pipe or passage 67 to the tank 64 supplies a flow of electrolyte below the "flush-level" of the rheostat, that is, out of contact with the electrodes 65, such electrolyte flowing through an opening in the bottom of the tank 64 into the reservoir 66 and thence to an outlet pipe 68. The preferred continuous flow of electrolyte is provided through the agency of a suitable pump which is illustrated, for example, in my copending application Serial No. 178,598, filed July 5, 1917. A double-diameter hollow cylindrical valve 69 is adapted to be raised and lowered within the bottom opening in the tank 64, whereby the electrolyte level is correspondingly raised or lowered, since when the larger-diameter lower portion of the valve 69 occupies an operative position to substantially fill the bottom tank opening, the sole outlet for the continuously flowing electrolyte is over the top of and down through the hollow valve 69 into the reservoir 66.

The rheostat valve 69 is preferably operated through the agency of an actuating mechanism 70 with which the valve may be mechanically associated in any suitable manner. For the sake of simplicity, the valve rod is shown as provided with a rack member 75 which meshes with a pinion 76, the shaft 77 of which is mounted in suitable brackets 78 and is provided with a second pinion 79. A second rack member 80 meshes with the pinion 79, and the outer ends of the rack member 80 constitute pistons 81 and 82 which travel within suitable operating cylinders 83 and 84, respectively. A normally closed valve 85 having an actuating coil "On" is associated with the outer end of the cylinder 83, while a normally open valve 86 having an actuating coil "Off" communicates with the outer end of the other cylinder 84, thereby normally biasing the apparatus to the illustrated position. Fluid pressure may be supplied to the valves 85 and 86 from any suitable source (not shown).

The mechanical operation of the actuating mechanism 70 may be set forth as follows: Upon concurrent energization of the actuating coils "On" and "Off", the normal unbalanced fluid-pressure conditions in the mechanism are reversed, that is, fluid pressure is admitted through the valve 85 to the cylinder 83 and is released from the cylinder 84 through the valve 86 to the atmosphere, whereby movement of the pistons downwardly, as viewed in Fig. 1, occurs to produce an upward movement of the rheostat valve 69. To arrest such movement at any time, it is merely necessary to deënergize the "off" coil, whereupon balanced high fluid-pressure conditions immediately obtain in the two operating cylinders and a positive and reliable stoppage of the mechanism is effected.

To produce a return movement of the apparatus, the actuating coils "On" and "Off" are concurrently deënergized, whereby fluid-pressure conditions in the mechanism revert to the original state and the desired backward movement is effected.

One actuating mechanism 70 is preferably employed for two liquid rheostats LR1 and LR2, whence, in the case of four-motor equipments, for which the present invention is readily adapted, only two actuating mechanisms are necessary, thereby simplifying the control of the liquid rheostats.

The maximum-level relay 33 has its actuating coil connected in series relation with an electrolytic interlock 71 which becomes operative when the electrolyte in the tank 64 reaches its greatest height, whereupon the short-circuiting switches J1 and M1 may be closed without producing an undesirable current surge. The terminals of the relay-coil circuit may be energized from any suitable source, but preferably from a portion of the transformer secondary winding 23, since the use of alternating-current prevents any electrolytic action between the separated terminals or plates of the interlock 71.

The "flush-level" relay 34 is similarly associated with an electrolytic interlock 72 and a source of low-voltage alternating current. The purpose of the relays 33 and 34 will be set forth in connection with the control circuits of Fig. 4.

The relay L is of the familiar limit-switch type, being energized in accordance with the current traversing one phase of the primary winding of the motor M1 to govern the operation of the actuating mechanism 70, as described in detail in connection with Fig. 2.

Assuming that the line switch LS has been closed to energize the primary transformer winding 22, the operation of the illustrated system may be set forth as follows: As indicated by the sequence chart Fig. 2, switch 14 is first closed, whereby a circuit is established from the left-hand terminal of the secondary transformer winding 23 through conductors 90 and 91, primary phase-converter winding 36, conductors 92 and 93, preventive coils 29, conductor 94, switch 14, conductors 95 and 96, alternating-current exciting field winding 43, armature 42 and compensating field winding 45 of the starting motor 25, conductor 97, contact segment 98 of the change-over switch 27 in its position "Start", and conductor 99 to a second terminal-point 100 of the transformer winding 23. The starting motor 25 is thus connected in series relation with the primary phase converter winding 36 across the major portion of the supply-circuit transformer secondary winding.

During such starting operation, the exciting winding 40 of the phase converter 24 is short-circuited through conductor 101, contact member 102 of the change-over switch 27 and conductor 103, whereby an induction-motor action supplemental to that of the squirrel-cage winding 39 is provided during the starting period.

The switch 15 is closed during the starting operation to impress a definite voltage from a section of the transformer winding 23 upon the primary converter winding 36, thereby insuring the rapid building-up of the secondary converter voltage in the winding 37.

After a certain time interval, the change-over switch 27 is actuated to its position "Run" by reason of the energization of the actuating coil 27-Run, as subsequently traced in detail, whereupon a direct-current circuit is established from the positive terminal 105 of the generating armature 26 of the motor-generator set 46 through conductor 105 and a plurality of contact segments 106 to 110, inclusive, which bridge certain sets of stationary contact members that are connected to the various sections of the direct-current exciting winding 44, whence circuit is completed through conductor 111 to the negative terminal of the armature 46. The former starting motor 25 thus becomes a direct-current generator that is driven by the phase-converter 24.

During the transitional movement of the change-over switch, the alternating-current exciting field winding 43 is temporarily short-circuited to prevent undesirable current or voltage surges.

The exciting circuit for the phase converter 24 is thereupon established from the positive terminal of the former starting-motor armature 42 through exciting field winding 43, conductor 96, contact member 115 of the change-over switch 27, conductor 103, exciting rotor winding 40 of the phase-converter, conductor 101, contact segment 116 of the change-over switch, conductor 97 and commutating field winding 45 to the negative terminal of the armature 42. In this way, the phase-converter 24 is provided with direct-current rotor excitation during operation thereof to provide a desired corrective action with respect to the power-factor.

Under full operating conditions of the phase-converter, a three-phase voltage obtains between conductors 120, 121 and 122, which are respectively connected to the conductor 90, the outer terminal of the phase-converter secondary winding 37 and the conductor 99. Upon the closure of switches A1, B1 and C1, energy is conveyed to the respective phase windings of the primary winding 61 of the induction motor M#2 from conductors 124, 125 and 126, which are respectively connected to the three-phase supply conductors 120, 121 and 122.

Cascade switches S1, S2 and S3 are also closed during the low-speed or cascade combination of the motors, whereby one terminal of the secondary winding 62 of the motor M#1 is connected through conductor 128, switch S1 and conductor 129 to one of the terminals of the star-connected primary winding 61 of the motor M#2; a second terminal of the secondary winding 62 of the motor M#1 is connected through conductor 130, switch S2 and conductor 131 to a second terminal of the primary winding 61 of the motor M#2; and a third circuit is completed from the remaining terminal of the secondary winding of the motor M#1 through conductor 132, switch S3, and conductor 133 to the remaining terminal of the primary winding of the motor M#2. The terminals of the secondary winding 62 of the motor M#2 are connected through conductors 134, 135 and 136, respectively, to the several electrodes 65 of the liquid rheostat LR2, which initially occupies its open-circuit or "off" position.

The induction motors M#1 and M#2 are thus connected in the familiar cascade relation and may be gradually accelerated by the above-described manipulation of the rheostat valve 69 to a certain low speed, such as 10 miles per hour. When the electrolyte in the rheostat has reached the plane marked "Maximum level," the switches J2 and M2 may be closed to short-circuit the secondary induction-motor winding.

To provide a higher range of operating speeds, the primary switches A1, B1, C1 and A2, B2, C2 may be closed and the switches R1, R2 and R3 substituted for the cascade switches S1, S2 and S3, as indicated in the sequence chart Fig. 3. The closure of the primary switches A2, B2 and C2 connects the primary terminals of the induction motor M#2 through conductors 140, 141 and 142, respectively, to the supply circuit conductors 120, 121 and 122. Under such conditions, the secondary-winding terminals of the motor M#1 are disconnected from the primary windings of the motor M#2 and are connected through switches R1, R2 and R3 and conductors 144, 145 and 146, respectively, to the electrodes 65 of the liquid rheostat LR1. The motors are thus connected in parallel relation to provide a high speed, such as 20 miles per hour, when the electrolytes in the respective rheostats LR1 and LR2 reach their "maximum-level" positions to permit the closure of the short-circuiting switches J1 and M1 and J2 and M2.

The function of the switches 1 to 13, inclusive, is to correct for phase distortions in the three-phase circuit under different conditions of load and also to compensate for the change from accelerating to regenerative operation, whereby a substantially balanced three-phase voltage may be obtained under substantially all operating conditions. Since such regulation is familiar to those skilled in the art, no detailed description thereof is necessary here. It is deemed sufficient to state that the point of connection of the secondary phase-converter winding 37 to the transformer winding 23 is varied along a predetermined intermediate section of the transformer winding, while the connection of the upper terminal of the primary phase-converter winding 36 to the right-hand portion of the transformer winding 23 is also changed to suit operating conditions.

Referring to Fig. 4, the auxiliary system shown comprises the actuating coils of the various switches of Fig. 1 and interlocking contact members thereof of the familiar type that is illustrated in Fig. 5, together with coöperating contact members of the several relays; a starting switch 148 for the phase-converter, having positions "Off," "Start"

and "Run"; a phase-balancing switch 149 having positions $a'$, $b'$ and $c'$ for regulating the various transformer secondary-winding switches 1 to 13, inclusive; a speed drum having running positions $c$ and $p$, corresponding to cascade and parallel connection of the sets of motors; an accelerating drum having positions "Lower," "Hold" and "Raise" for primarily governing the operation of the liquid-rheostat actuating mechanisms 70; a master reverser MR for governing the direction of rotation of the driving induction motors; and a suitable auxiliary source of energy, such as a battery B, which may be charged from the illustrated motor-generator set.

Assuming that it is desired to effect operation of the phase-converter 24, the starting switch 148 may be moved to its position "Start" in opposition to the action of a biasing spring 150, whereby a circuit is established from the positive terminal of the battery B through conductors 160 and 163, control fingers 164 and 165 which are bridged by contact segment 166 of the master reverser MR in its forward position, conductor 167, control fingers 168 and 169 which are bridged by contact segment 170 of the phase-converter starting switch 148, conductor 171, the actuating coil of the switch 14, interlock 10-out and conductors 172 and 174 to the negative battery terminal.

As soon as the starting motor 25 has been set into operation in the previously described manner by the closure of the switch 14 and the relay 32 has, therefore, been raised to its upper or circuit-closing position, a further circuit is completed from the conductor 171 through coöperating contact members 175 of the relay 32, the actuating coil of the switch 15, coöperating contact members 176 of an auxiliary relay 177 in its lower position and interlock 10-out to the negative battery conductor 172. As soon as the switch 15 has closed, a holding circuit for its actuating coil is formed by the bridging of the coöperating contact members 175 of the relay 32 by interlock 15-in.

By manually actuating the phase-converter starting switch 148 to its position "Run", after a suitable interval of time, a further circuit is completed from the contact segment 170 thereof through control finger 180, conductors 181 and 182 and the actuating coil of the auxiliary relay 177 to conductor 172. Thus, the relay 177 is lifted to its upper position to open-circuit the actuating coil of the switch 15. Thereupon, a further circuit is completed from the conductor 182, through conductor 183, coöperating contact members 184 of the converter-secondary-winding relay 30 in its upper position, the actuating coil of the switch 10, interlock 15-out and conductor 172 to the negative battery terminal.

A new circuit is thereby completed from the positive battery conductor 160 through conductors 185 and 185a, the parallel-related actuating coils of the switches 4 and 11, conductor 186, interlock 10-in, the coöperating contact members 187 of the line relay 31 in its upper position and negative battery conductor 172.

The closure of the switch 10 effects the opening of the switch 14 by reason of the exclusion of the interlock 10-out from the energizing circuit of the actuating coil for the switch 14, whereby a further circuit is established from the positively-energized conductor 185 through conductor 188, interlock 14-out, actuating coil 27-run of the change-over switch 27 and interlock 4-in to negative conductor 172. The change-over switch 27 is thus actuated to its position "Run", and the energizing or "holding" circuit is independent of the phase-converter starting switch 148 which may, therefore, be released by the train operator and is returned to the "off" position by the spring 150.

However, if the supply-circuit energy or the battery energy is interrupted to effect the opening of the switches 4 and 11 by the opening of the line relay 31 in the case of inoperativeness of the polyphase circuits, then the change-over switch 27 is automatically returned to its "start" position by reason of the completion of a circuit from the interlock 14-out through the actuating coil 27-Start and interlock 4-out to the negative conductor 172. In this way, the change-over switch 27 is electromagnetically actuated to its "run" position under certain relative or interlocked conditions of various other circuits and is automatically returned to its "off" position upon an interruption of main or auxiliary-circuit energy.

If the phase-balancing switch 149 occupies the illustrated position $a'$, a circuit is established, as soon as the switch 10 is closed, from the positively energized battery conductor 160 through conductor 189 and control finger 190 to contact segment 191 of the balancing switch. Control fingers 192 and 193 are thereby energized, a circuit being continued from control finger 192 through conductor 194, interlocks 5-out, 6-out and 12-out, the parallel-related actuating coils of the switches 1, 2 and 8 and thence through conductor 186 and the interlock 10-in as already traced. A further circuit is established from the control finger 193 through conductor 195, interlocks 7-out and 13-out and the parallel-related actuating coils of the switches 3 and 9 to the conductor 186. Thus, a predetermined regulation of the phase-converter to correct for secondary-voltage distortion is effected. In positions $b'$ and $c'$ of the balancing switch 149, the switches 5, 6 and 12, and 7 and 13, respectively, are closed, under the proper interlocking conditions, to compensate for the above-mentioned phase distortion under different load conditions.

After the phase converter is operating under full speed and voltage conditions, the speed drum may be actuated to its transition position $a$ and the accelerating drum may be moved to its position "Raise", whereby one circuit is completed from the positively-energized control finger 165 of the master reverser MR, through conductor 199, control fingers 200 and 201, which are bridged by contact segment 202 of the speed drum, conductors 203 and 204, the parallel-related actuating coils of the cascade switches S1, S2 and S3, interlocks C2-out, S1-out and C1-out, coöperating contact members 205 of the "flush-level" relay 34 in its lower or deënergized position, conductor 206, control fingers 207 and 208, which are bridged by contact segment 209 of the speed drum, and conductor 210 to the negative battery conductor 172.

Upon the closure of the switch S1, a "holding" circuit for the cascade switches is established from the interlock C2-out through interlocks S1-in and R1-out and conductor 211 to the negative conductor 172.

Another circuit is established from the positively energized control finger 165 of the master reverser MR through conductor 221, control fingers 222 and 223, which are bridged by contact segment 224 of the accelerating drum, conductors 225 and 226, the actuating coil "On" of the actuating mechanism 70, conductors 227 and 228 and interlocks S3-in and R3-out to the conductor 206, whence circuit is completed to the negative battery terminal as already described. A similar circuit is completed from the contact segment 224 of the accelerating drum through control finger 229, conductor 230, the actuating coil Off, conductor 232, coöperating contact members 233 of the limit switch L in its lower position and thence through conductor 228 as just traced.

Since both actuating coils of the rheostat-operating mechanism 70 are energized, movement of the valve 69 occurs to raise the electrolyte to the plane marked "Flush-level."

Under such conditions, a circuit is established from the conductor 203 through interlocks S2-in and R2-out, conductor 212, coöperating contact members 213 of the "flush-level" relay 34 in its upper or energized position, interlock 4-in, conductor 214, the parallel-related actuating coils of the primary switches A1 and B1, interlocks RB1-out and RA1-out, conductor 215, control fingers 216 and 217, which are bridged by contact segment 218 of the master reverser, conductor 219, and control finger 220 to the contact segment 209 of the speed drum, whence circuit is completed to the negative battery terminal in a manner already set forth. The closure of the switch A1 completes a further circuit from the conductor 214 through the actuating coil of the switch C1 and interlock A1-in to the above-mentioned interlock RB1-out. Thus, the primary switches A1, B1 and C1 for the induction motor M1 are closed.

Without detailed description, it will be readily observed that when the master reverser MR occupies its reversed position, the actuating coils of the switches RA1 and RB1 are first energized in a manner similar to that just mentioned, in connection with the switches A1 and B1, and thereupon, the actuating coil of the switch C1 is also energized.

The rheostat valve 69 and an auxiliary contact-carrying or interlock drum 234, that is mounted upon the shaft 77, are thus actuated toward "maximum-level" positions in accordance with the movements of the limit switch L, which is lifted to interrupt the circuit of the off coil and thus stop the valve movement whenever the accelerating current for the induction motor M1 reaches a predetermined value.

When the "maximum level" position is reached in the rheostat LR2, a circuit is completed from the conductor 225 through conductor 235, the parallel-related actuating coils of the switches J2 and M2, conductor 236, coöperating contact members 236a of the maximum-level relay 33 in its upper or closed position, conductor 237, control fingers 238 and 239 which are bridged by contact segment 240 of the auxiliary drum 234 in its final position and conductor 241 to the conductor 228. The rheostat LR2 and the corresponding secondary motor winding 62 are thus short-circuited when the valve 69 has reached its uppermost position and the electrolyte has attained its maximum level.

It will be noted that three control fingers, respectively numbered 254, 260 and 262, which are connected to conductors 253, 261 and 263, respectively, are provided in the speed drum. The fingers respectively correspond to parallel connection of the motors M1 and M2 and to the cascade and parallel connection of a duplicate set of motors which, for the sake of simplicity and clearness, has not been shown. Since the main and also the auxiliary circuits of the other set of motors are practically identical with those illustrated, it is not considered necessary or desirable to show the complete duplication of such circuits. Consequently, the legends "To other cascade switches" and "To other parallel switches" that are applied to the conductors 261 and 263, and the legend "To other primary switches," that is applied to conductor 257 and the corresponding parallel-running reversing conductor will be sufficient to clearly convey the idea of a further set of two induction motors that are controlled from the same speed drum and accelerating drum.

The control fingers 207 and 254 engage the contact segment 209 in positions $a$ and $p$, respectively, whereas the corresponding fingers 260 and 262 engage the contact segment in positions $c$ and $b$, respectively. In this way, the starting and the transition of the sets of motors are each effected in alternation. A complete loss of torque during transition is thus prevented, as fully set forth and claimed in my copending application, Serial No. 861,767, filed September 15, 1914, patented Nov. 13, 1917, No. 1,246,421.

To effect transition of the sets of motors from the described cascade relation to parallel relation, the speed drum is gradually moved from its cascade position $c$ through transition position $b$ to parallel position $p$, whereby the following sequence of operation occurs: First, the control finger 260 is disengaged from the contact segment 209, whereby the maximum-level relay device 33 is deenergized by reason of the interruption of its control circuit as soon as the "on" and "off" coils of the actuating mechanism corresponding to the unillustrated liquid rheostats are deënergized to effect a gradual lowering of the corresponding rheostat valves. As soon as the liquid level becomes lower than the plane marked "Flush-level," the primary switches of the unillustrated motors drop out by reason of the deënergization of their actuating coils when the corresponding "flush-level" relay device 34 is deënergized and drops to its lower position.

The speed drum contact segment 209 next engages control finger 262, whereby conductor 263 is energized to close the unillustrated parallel-connecting switches in a manner about to be described in connection with the switches R1, R2 and R3, whereupon the cascade switches corresponding to S1, S2 and S3 are opened by reason of the exclusion from their actuating-coil circuits of an interlock corresponding to the interlock R1-out that is connected in circuit with the actuating coils of the switches S1, S2 and S3. The circuit of the actuating coils "on" and "off" is then reënergized through interlocks corresponding to R3-in and S3-out, which are connected between conductors 228 and 253, as about to be described. Finally, the primary switches for the unillustrated motors will close as soon as the flush-level relay is energized, which occurs after the electrolytic interlock and also interlocks corresponding to S3-out, R2-in, S2-out and S1-out, which serve to connect conductors 214 and 256, have been inserted in circuit. The analogous circuit connections to those just recited, and which are employed for the induction motors M1 and M2, are governed in the latter part of the speed-drum movement, as about to be set forth in detail. The purpose of the arrangement recited is to effect alternate transition or change-over of the sets of motors from cascade to parallel relation, whereby a complete loss of accelerating torque is obviated and thus a relatively smooth transition from the one speed range to the other is produced, as previously mentioned.

When control finger 207 breaks contact with the drum segment 209 in passing from position $b$ to position $p$, the governing circuit including conductor 228 for the illustrated "on" and "off" coils is interrupted, thus permitting the valves 69 of the rheostats LR1 and LR2 to fall to their lowest position, thus deënergizing the maximum level relay 33 and the flush-level relay 34 as the height of the electrolyte gradually decreases. The primary switches A1, B1 and C1 are opened as soon as the "flush-level" is passed, by reason of the separation of the contact members 213 of the relay 34, which contact members are connected in circuit with the actuating coils of the primary switches.

When the speed drum has reached its final parallel position $p$, the contact segment 209 engages control finger 254, whereby a circuit is completed from conductor 204 through the parallel-related actuating coils of the switches R1, R2 and R3, conductor 250, interlocks R1-out, C1-out and C2-out, coöperating contact members 252 of the flush-level relay 34 in its lower or deënergized position, and conductor 253 to the control finger 254. The liquid rheostat LR1 is thus connected in active circuit relation with the secondary winding 62 of the induction motor M1, as previously described in detail. As soon as the switch R1 has closed, the energizing circuit of the actuating coils for the cascade switches S1, S2 and S3 is deënergized, since the interlock R1-out is excluded from that circuit. Furthermore, a holding circuit for the actuating coils of the parallel switches R1, R2 and R3 is formed through interlocks R1-in and S1-out and conductor 255 to the conductor 211 and the negative battery conductor 172, thus rendering the energizing circuit of the switches R1, R2 and R3 independent of the flush-level relay 34.

The common negative conductor 228 for the actuating coils "on" and "off" of the rheostat-operating mechanism 70 is then connected through interlocks S3-out and R3-in to the conductor 253, whereby the actuating coils are again energized to effect step-by-step movement of the liquid-rheostat valves in accordance with the position of the limit switch L.

As soon as "flush-level" in the rheostats LR1 and LR2 is reached, the relay 34 is energized through its electrolytic interlock 72, thus completing the circuit of the actuating coils of the primary switches A1, B1 and C1 in the manner previously described and establishing a further circuit from conductor 214 through interlocks S3-out, R2-in, S2-out and S1-out, conductor 256, the parallel-related actuating coils of the primary switches A2 and B2, interlocks RB2-out and RA2-out and conductor 257 to the conductor 215, whence circuit is completed to the negative battery conductor as previously traced. Upon closure of the switch A2, a further circuit is completed from the conductor 256 through the actuating coil of the primary switch C2 and interlock A2-in to the above-mentioned interlock RB2-out.

When the liquid level in the various rheostats has reached the respective planes marked "Maximum level," the short-circuiting switches M2 and J2 are closed in the previously-described manner and a similar circuit is completed from the conductor 235 through interlock R2-in and the parallel-related actuating coils of the short-circuiting switches M1 and J1 to the coöperating contact member 236a of the maximum-level relay 33, which is energized through its electrolytic interlock 71 in the "maximum-level" position of the electrolyte.

If it is desired to effect the converse transition from parallel relation to cascade relation of the sets of motors, the above-mentioned sequence of transitional operation is reversed, as will be understood, and, in this case also, the sets of motors are changed over alternately, thereby avoiding a complete loss of torque.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit and a plurality of induction motors, of means for varying the speed thereof, a plurality of sets of switches respectively corresponding to supply-circuit connection, to cascade relation and to parallel relation of said motors, manual means for primarily governing the operation of said switches and of said speed-varying means, and interlocking means for insuring the proper sequence of operation of said switches and said speed-varying means to provide a plurality of ranges of operating speeds corresponding to cascade and parallel operation.

2. In a system of control, the combination with a supply circuit and a plurality of induction motors severally having primary and secondary windings, of a plurality of variable-resistance devices normally connected to, and disconnected from, the respective secondary windings, a plurality of sets of switches for respectively connecting each of the motor primary windings to the supply circuit, connecting said normally disconnected secondary winding of one motor to the primary winding of another during cascade operation, and connecting said secondary winding to the corresponding variable-resistance device during parallel operation, manual means for primarily governing the operation of said switches and said variable-resistance devices, and electrical interlocking means for insuring the proper sequence of operation of said switches and said variable-resistance devices to provide a plurality of ranges of operating speeds corresponding to cascade and parallel operation.

3. In a system of control, the combination with a supply circuit and a plurality of induction motors severally having primary and secondary windings, of a plurality of liquid rheostats normally connected to, and disconnected from, the respective secondary windings, an operating mechanism for said rheostats having a plurality of actuating coils, a plurality of sets of switches, severally provided with actuating coils, for respectively connecting each of the motor primary windings to the supply circuit, connecting said normally disconnected secondary winding of one motor to the primary winding of another during cascade operation, and connecting said secondary winding to the corresponding liquid rheostat during parallel operation, manual means for primarily effecting the energization of the various actuating coils, and electrical interlocks for insuring the proper sequence of operation of said switches and said liquid rheostats to provide a plurality of ranges of operating speeds corresponding to cascade and parallel operation.

4. In a system of control, the combination with a supply circuit and a plurality of induction motors severally having primary and secondary windings, of a plurality of liquid rheostats normally connected to, and disconnected from, the respective secondary windings, an operating mechanism for said rheostats having a plurality of actuating coils, a plurality of sets of switches, severally provided with actuating coils, for respectively connecting each of the motor primary windings to the supply circuit, connecting said normally disconnected secondary winding of one motor to the primary winding of another during cascade operation, and connecting said secondary winding to the corresponding liquid rheostat during parallel operation, manual means for primarily effecting the energization of the various actuating coils to provide a plurality of ranges of operating speeds corresponding to cascade and parallel operation, and electrical interlocking means for insuring the following sequence of operation during the transition from cascade to parallel connection; the operating-mechanism coils are governed to increase the circuit resistance value of the single active liquid rheostat, the supply-circuit connecting switches of the single motor fed directly from the supply circuit are opened prior to the opening of the secondary circuit by the rheostat, the parallel connecting switches are closed, the cascade-connecting switches are opened, the operating-mechanism coils are governed to close both secondary winding circuits through the respective rheostats, and the supply-circuit-connecting switches of both motors are closed after the closure of the secondary circuits.

5. In a system of control, the combination with a supply circuit and a plurality of induction motors severally having primary and secondary windings, of a plurality of liquid rheostats normally connected to, and disconnected from, the respective secondary windings, a plurality of sets of switches for respectively connecting each of the motor primary windings to the supply circuit, connecting said normally disconnected secondary winding of one motor to the primary winding of another during cascade operation, and connecting said secondary winding to the corresponding liquid rheostat during parallel operation, and means for preventing the closure of any of said switches until the secondary-winding circuit has been closed through one or both of said rheostats.

6. In a system of control, the combination with a supply circuit and a plurality of induction motors severally having primary and secondary windings, of a plurality of liquid rheostats, severally having a set of electrodes and a body of electrolyte changeable in level, normally connected to, and disconnected from, the respective secondary windings, a plurality of sets of switches for respectively connecting each of the motor primary windings to the supply circuit, connecting said normally disconnected secondary winding of one motor to the primary winding of another during cascade operation, and connecting said secondary winding to the corresponding liquid rheostat during parallel operation, and a relay device for permitting the closure of any of said switches only after a predetermined liquid level in the liquid rheostats is attained.

In testimony whereof, I have hereunto subscribed my name this 29th day of June, 1917.

ARTHUR J. HALL.

Copies of this patent may be obtained for five cents each, by addressing the "Commissioner of Patents, Washington, D. C."